United States Patent [19]

Tsukamoto et al.

[11] 3,872,453

[45] Mar. 18, 1975

[54] INFORMATION RETRIEVAL SYSTEM

[75] Inventors: Katsuji Tsukamoto; Nobuichi Ikeno; Keiji Okada, all of Tokyo, Japan

[73] Assignee: Nippon Telegraph and Telephone Public Corporation, Tokyo, Japan

[22] Filed: Sept. 18, 1973

[21] Appl. No.: 398,429

[30] Foreign Application Priority Data

Sept. 18, 1972 Japan .............................. 47-93963

[52] U.S. Cl.......... 340/173 LM, 340/172.15, 353/26
[51] Int. Cl............................................. G11c 13/04
[58] Field of Search................. 340/173 LM; 353/26

[56] References Cited

UNITED STATES PATENTS

| | | | |
|---|---|---|---|
| 3,401,268 | 9/1968 | Lea | 340/173 LM |
| 3,614,191 | 10/1971 | Sakaguchi | 340/173 LM |
| 3,789,372 | 1/1974 | Lejon | 340/173 LM |

*Primary Examiner*—Terrell W. Fears
*Attorney, Agent, or Firm*—Flynn & Frishauf

[57] ABSTRACT

An information retrieval system which comprises an optical system for scanning a film stored with informations by means of holography using a laser beam modulated according to the respective symbols constituting a series of symbols in inquiry information and generating a bright or dark signal according to whether or not a symbol selected from the above-mentioned sequence coincides with a symbol included in any desired information; photoelectric conversion elements for converting said signal into an electric signal denoting a logic notation "1" or "0;" and a retrieval logic circuit for logically processing a signal from said photoelectric converting elements and generating a detection signal indicating a logic notation 1 or 0.

10 Claims, 13 Drawing Figures

| | | |
|---|---|---|
| * | D | A |
| B | C | E |
| A | B | F |

INFORMATION RETRIEVAL SYSTEM

BACKGROUND OF THE INVENTION

This invention relates to an optical information retrieval system and more particularly to an apparatus for optically detecting whether or not a large amount of information recorded in a storage medium by means of holography includes a desired piece of information.

An information retrieval system knows to date consists in detecting whether or not a desired piece of information is included in a memory stored with a large amount of information, as a preliminary step to reading out the entire text of said desired piece of library information. What has been demanded of such retrieval system is that the system itself be not bulky, as much information as possible be stored in a memory of prescribed size and said information be quickly processed for detection of a desired piece of information. However, any prior art system of such type has failed fully to meet the above-mentioned requirements. Generally known is an information retrieval system using a magnetic tape as, for example, a memory and scanning it electromagnetically. However, this system has the drawbacks that it can only store a small amount of information as viewed from a practical purpose, and carries out retrieval at a considerably slow rate.

SUMMARY OF THE INVENTION

It is accordingly an object of this invention to provide an information retrieval system capable of fully meeting the above-mentioned requirements.

A further object of the invention is to provide an information retrieval system having a retrieval logic circuit for detecting coincidence between unit words by repeatedly collating unit characters.

Still another object of the invention is to provide an information retrieval system which is adapted to carry out, for example, the simple detection of the above-mentioned coincidence by means of hardware to elevate the operating efficiency of a computer, and also to read out a plurality of information blocks simultaneously so as to reduce reading time.

According to an aspect of the invention, there is provided an information retrieval system which comprises a memory stored with a large amount of optically recorded information; means for optically scanning the memory according to the kind of desired information and generating a prescribed output signal; and a logic circuit for logically processing said output signal and generating an output signal indicating whether or not the desired information is stored in the memory.

BRIEF DESCRIPTION OF THE DRAWINGS

FIG. 5 indicates a logic circuit adapted for use with the information retrieval system of the invention;

FIGS. 6 to 9 are simplified illustrations of the information retrieval system of the invention for better understanding of the principle of said system: FIG. 6 shows a pattern of information expressed by characters; FIG. 7 indicates part of a logic circuit where the first one of a given series of characters has been scanned; FIG. 9 shows part of the logic circuit where the third character of the aforesaid series has been scanned through the first row of stored data; FIG. 10 shows a photographic plate used as an information-recording medium; and FIG. 11 presents the logic circuit of said information retrieval system.

DESCRIPTION OF THE PREFERRED EMBODIMENTS

Figure 1:
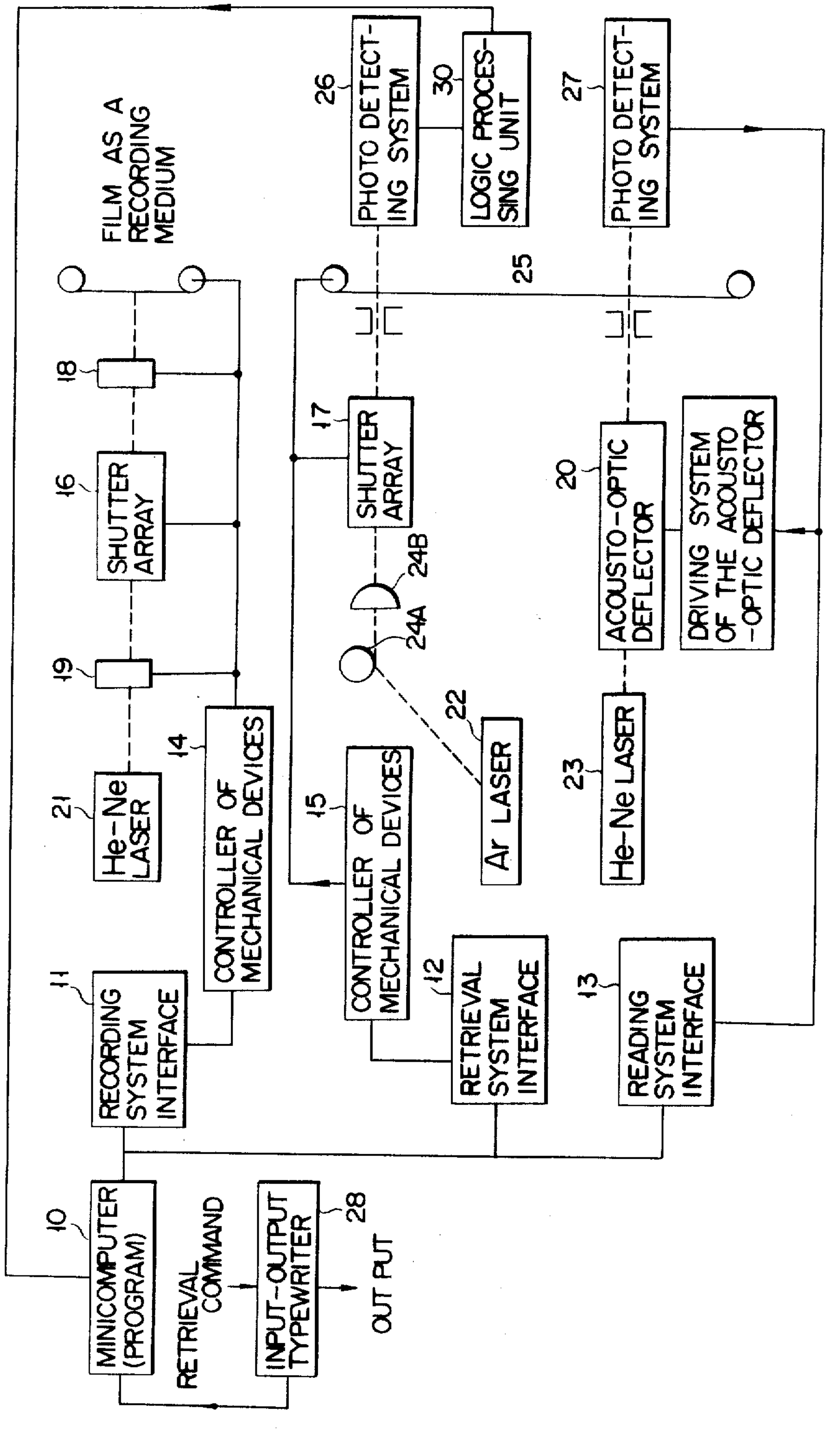
FIG. 1 is a schematic block circuit diagram of a library information processing system with which the information retrieval system of this invention is used.

There will now be described by reference to FIG. 1 a information processing system in which the information retrieval system of this invention is incorporated. This information processing system selects a desired piece of information from a memory stored with a large amount of information by designating the logic relationship of some referential characters constituting a prescribed series. The processing system consists of three sections of recording retrieval and readout. Since this invention is primarily concerned with the retrieval section, the other sections are briefly touched.

Numeral 10 denotes a minicomputer which controls logic processing circuits, as well as mechanical parts such as shutter arrays 16, 17, slit 18 and exposure chopper 19, reads out the results of detection and drives an acousto-optic deflector 20 to scan out a desired piece of literature by a laser beam and read out the text of said literature, all these operations being effected through interfaces 11, 12, 13 and the control devices 14, 15 of the mechanical parts. A computer 10 used for the above-mentioned object may consist, for example, of the PDP 11/20 type of Digital Equipment Corp. (U.S.A.). The light source 21 of the recording section may be provided by an He—Ne laser (10 milliwatts), the light source 22 of the retrieval section by an Ar laser (1.6 watts) and the light source 23 of the readout section by an He—Ne laser (30 milli-watts). A rotating mirror 24A and a cylindrical lens 24B cooperate in deflecting a laser beam for concentration on a prescribed cross section so as to scan a film 25 along its length. The slit 18 is used to define the point on the film 25 to which a laser beam is directed. The shutter units constituting the shutter arrays 16 and 17 may each consist of an electromagnetic shutter. The recording shutter array 16 consists of shutter units representing three characters (36 bits) and the retrieval shutter array 17 is formed of shutter units denoting one character (12 bits). The acousto-optic deflector 20 included in the reading system is a deflector consisting of single crystal $TeO_2$, and photo-detecting systems 26 and 27 supplied with light and dark signals from a film 25 are each formed of a phote-diode array.

Provided on the input and output sides of the minicomputer 10 is an input-output typewriter supplied with a user's retrieval command.

The recording system 11 is used in recording a large amount of literature on a 35 mm film by means of holography. This recording system is already set forth in the present inventors' U.S. patent application Ser. No. 217,157, filed on Jan. 12, 1972, detailed description thereof being omitted.

Figure 2:
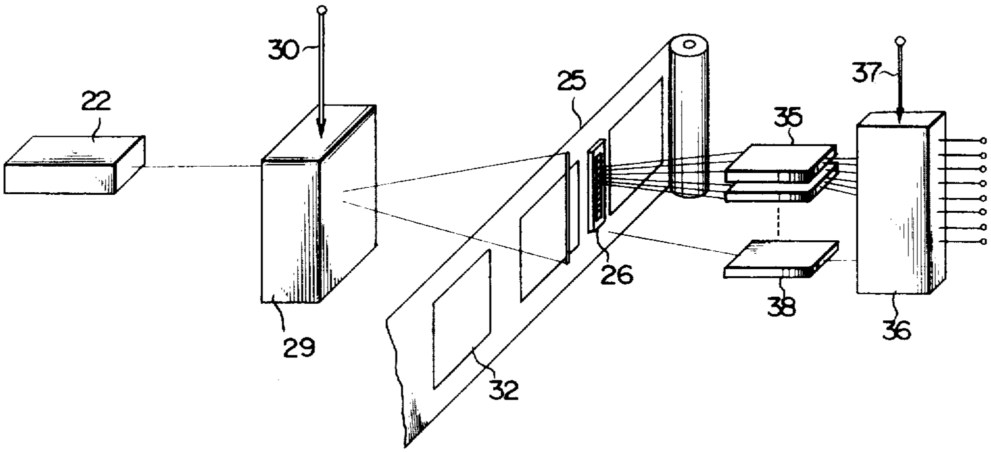
FIG. 2 is a schematic representation of an information retrieval system according to an embodiment of this invention.

The retrieval system comprises an optical system denoted by numeral 29 in FIG. 2 including a source 22 of coherent light, namely, the aforesaid Ar laser, a rotating mirror 24A, shutter array 17, and a cylindrical lens 24B disposed between said rotating mirror 24A and the shutter array 17. Referring to FIG. 2, the optical system 29 modulates a light beam supplied thereto from the laser source 22 so as to match a desired character pattern introduced through an input terminal 30 for detection, and deflects a beam of light thus modulated to be projected to a given block of the film 25. When the modulated beam of light is brought back to its original position after being deflected to be projected to said block, then a succeding block is set in position for exposure to a light beam by moving the film 25 along the length. This operation is repeatedly carried out. The cylindrical lens 24B (FIG. 1) included in the optical system 29 concentrates a light from the source 22 in the longitudinal direction, causing the light delivered from the optical system 29 to be brought to the film with the incidence plane of the light elongated in the transverse direction of the film 25. The dimensions of said incidence plane are determined by the size and number of the later described holograms recorded on the film 25.

Figure 3:
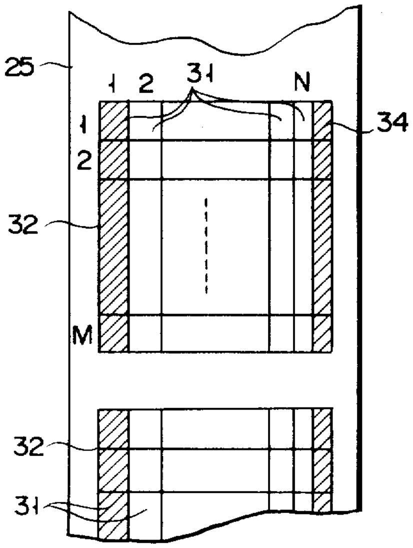
FIG. 3 schematically illustrates a film in which information is stored for each subblock.
Figure 4:
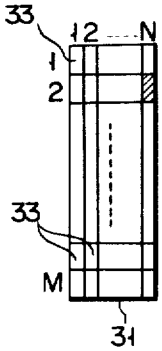
FIG. 4 is an enlarged view of the subblock of FIG. 3.

The process of recording library information on the film 25 according to one of the preferred embodiments by means of holography is already set forth in the specification of the previous present inventors' U.S. patent application. In this invention, too, said recording is effected in the form shown in FIGS. 3 snd 4 in pursuance to the aforesaid U.S. patent application. Namely, a large amount of information is recorded on the film 25 by a plurality of main blocks 32, each of which has some (eight in this embodiment) subblocks 31 representing the respective pieces of literature which are arranged parallel transversely of the film 25. The main blocks 32 are spatially arranged in a prescribed number along the length of the film 25. Further, each subblock itself consists of a prescribed number of holograms 33. A hologram 34 for delivering a timing signal is provided for each main block 32 along the length of the film 25. The film 25 is impressed at the initial part with a start mark and of the terminal part with an end mark, though neither mark is indicated. In one of the preferred embodiments, each main block 32 is formed of holograms bearing a number of 24 × 49, and has four subblocks 31 on each side of the timing track or the aforesaid hologram 34 intended to generate a timing signal. Namely, each main block 32 contains eight pieces of information. Information representing one piece of literature is formed of 24 × 6 holograms, each of which records a diffraction pattern of three characters.

The optical system 29 is so designed that when a memory or film 25 stored with the above-mentioned amount of information is exposed to the modulated beam of light, the longitudinal length of the incidence plane of an incoming light fully extends across the main block 32 and that scanning by the modulated beam of light deflected along the length of the film 25 is effected along the full length of the main block 32.

Where the characters brought to the optical system 29 coincide with those recorded in the film 25 as the result of retrieval by the above-mentioned deflected beam of light, then said light penetrates the film 25 to its backside. Conversely where such coincidence is not attained, no light appears on the backside of the film 25. Namely, bright and dark shades of light take place according to whether or not an input signal coincides with a stored signal. These bright and dark shades of light are detected by the corresponding light receiving elements of the light receiving system 26 provided on the backside of the film 25, thereby generating current corresponding to said bright and dark shades of light. The output current is amplified by any of the amplifiers 35 corresponding to the light receiving elements and then conducted to a logic processing circuit 36. At this time, a timing pulse signal delivered from the aforesaid timing hologram 34 is also transmitted to the logic processing circuit 36 through an amplifier 38. The logic processing circuit 36 logically detects whether or not a prescribed combination of character (a plurality of combined characters) introduced through an input terminal 37 for retrieval is stored in the film 25, using a timing signal delivered from the detecting and amplifying unit 35, signals denoting the first and last ones of said prescribed combination of characters and an output signal from the detecting and amplifying unit 35. The logic processing circuit 36 (FIG. 5) has input terminals $D_1$ to $D_t$ ($t = n \times p$) connected to the detecing and amplifying unit 35. Each input terminal is supplied with a signal denoting a logical notation "1" or "0" according to whether or not a photo detector is exposed to light, through the photo detector and detecting an amplifying unit 35. The input terminals are respectively connected to one of the two input terminals of each of AND gates $G_{11}$, $G_{21}$ . . . $G_{t1}$ constituting a first group and each of the other AND gates $G_{12}$, $G_{22}$ . . . $G_{t2}$ forming a second group. The other input terminal of each of the AND gates $G_{11}$, $G_{21}$ . . . $G_{t1}$ of the first group is supplied with a signal $C_1$ denoting the first one of the prescribed combined characters which is delivered from the input terminal 37 of the logic processing circuit 36. The output terminals of the first group AND gates $G_{11}$, $G_{21}$ . . . $G_{t1}$ are connected to one of the two input terminals of each of OR gate $G_{13}$, $G_{23}$ . . . $G_{t3}$. The other input terminal of each of said OR gates $G_{13}$, $G_{23}$ . . . $G_{t3}$ is connected to the output terminal of each of the second group AND gates $G_{12}$, $G_{22}$ . . . $G_{t2}$. The output terminal of each of the OR gates $G_{13}$, $G_{23}$ . . . $G_{t3}$ is connected to the other input terminal of the second group AND gate of the next stage through the corresponding shift register 39 of *m* bits to receive output signals $O_1$, $O_2$ . . . $O_t$ from the shift registers 39. To describe in detail, the output terminal of the first stage OR gate $G_{13}$ is connected to the input terminal of the second stage AND gate $G_{22}$. The output terminal of the i-stage OR gate $G_{13}$ is connected to the input terminal of the $(i + 1)$ stage AND gate $G_{(i+1)2}$ where *i* denotes an integer up to 2 to $(t - 1)$, and the output terminal of the last stage OR gate $G_{t3}$ is connected to the input terminal of the first stage AND gate $G_{12}$ through the corresponding shift registers 39 of *m* bits. Further, another shift register 40 of 1 bit is disposed between the last stage shift register 39 and the first stage AND gate $G_{12}$. It is possible to replace the last stage shift register 39 of *m* bits by another shift register of $(m + 1)$ bits instead of additionally providing the above-mentioned 1 bit shift register 40. Each of the $m$ bit shift registers 39 has an input terminal CL supplied with a timing pulse delivered from the timing hologram 34 and is subjected to shifting upon receipt of the timing pulse.

The output terminals of the OR gates $G_{13}$, $B_{23}$ . . . $G_{l3}$ are connected to the corresponding input terminals of an OR gate G4 through conductors $A_1$, $A_2$ . . . $A_l$ respectively. The output terminal $B_1$ of the OR gate $G_4$ is connected to one of the two input terminals of an AND gate $G_5$, the other input terminal of which is connected to the terminal 41 which is supplied with a signal Cs denoting the last one of a prescribed series of characters. The output terminal of the AND gate $G_5$ is connected to the set terminal of an R.S flip-flop circuit 42, whose reset terminal is supplied with the signal $C_1$ denoting the first one of a prescribed series of characters. The output terminal 43 of said R.S flip-flop circuit 42 generates a signal denoting the result of retrieval in the form of either 1 or 0.

There will now be described the operation of the logic processing circuit 36. When there is detected a signal denoting the first one of a prescribed series of characters used as a reference, then the flip-flop circuit 42 is reset and the first group AND gates $G_{11}$, $G_{21}$ . . . $G_{l1}$ are open. Under this condition, the optical system modulates a light beam in accordance with a signal denoting the first character. The modulated light beam optically scans the holograms in the first row. If, in this case the first row hologram includes information which may be represented by the signal of the first character, then the corresponding one or ones of the aforesaid input terminals $D_1$ to $D_l$ is supplied with a signal 1 and all remaining input terminals are supplied with a signal 0. The 1 or 0 signal is stored in the $m$ bit shift registers 39 through the first group AND gates $G_{11}$, $G_{21}$ . . . $G_{l1}$ and OR gates $G_{13}$, $G_{23}$ . . . $G_{l3}$. When the modulated beam of light scans the second row hologram by being deflected along the length of the film 25, then a timing signal is conducted to the terminal CL to cause the 1 or 0 signal stored in the first bit section of the $m$ bit shift registers 39 to be shifted to the second bit section, and in consequence the first bit section of the shaft registers 39 to be stored with a 1 or 0 signal corresponding to the result of retrieval carried out in the aforesaid manner. Repetition of the above-described operation causes the hologram to be scanned for collation up to the subblock of the $m$ order with respect to the signal denoting the first one of the prescribed series of characters. Namely, when one block of the film 25 consisting of an $m$ number of subblocks is fully collated or retrieved, then an $m$ number of signals denoting the results of the above-mentioned collation or retrieval are recorded in the $m$ bit shift registers 39.

Next, the hologram is again collated or retrieved optically in a similar manner using a signal of modulated light with respect to the second character. Since, in this case, the signal $C_1$ denoting the first character is not generated, the first group AND gates $G_{12}$, $G_{22}$ . . . $G_{l2}$ are obviously closed. Now let the input terminal $D_l$ be considered. Where the hologram corresponding to the input terminal $D_l$ coincides with the second character whose collation or retrieval has been carried out throughout one block of the film 25, then said input terminal $D_i$ is supplied with a 1 signal. If, in this case, data stored in the *m–th* or last bit section of the $(i-1)$ stage shift register 39 represents a 1 signal, then said data coincides with the 1 signal supplied to the above-mentioned input terminal $D_i$. Accordingly, the AND gate $G_{i2}$ of the $i$ stage is opened to generate a 1 signal, which in turn is recorded in the first bit section of the $i$-stage shift register 39. Namely, only when characters representing some of the holograms constituting one subblock of the film 25 have the same combination and arrangement as, or an exact coincidence with, a prescribed series of characters which are to be collated or retrieved, the corresponding shift register 39 is stored with a 1 signal. Where the characters denoting holograms included in the first two rows of the subblock coincide with the characters of the prescribed series of retrieval, then the result of coincidence between the character of any of the holograms in the first row of the subblock and any of the characters of the prescribed series is stored in the 1 bit shift register 40. An output signal 1 from said register 40 and another output signal 1 denoting the coincidence on the second row of the subblock are jointly conducted to the corresponding AND gate $G_{12}$ which in turn generates a 1 signal. As mentioned above, coincidence between the characters of the prescribed series for collation or retrieval and the stored characters denoting the holograms included in the respective rows of one subblock is determined in succession. Where collation or retrieval is made of the last character of the prescribed series for retrieval, then a signal $C_n$ denoting said last character is generated to open the AND gate $G_5$. Where the respective characters of the prescribed series subjected to the above-mentioned collation or retrieval coincide in the same sequence with the characters of some of the holograms included in one subblock, then the corresponding $m$ bit shift register 39 is stored with a 1 signal. Where the last character of the prescribed series coincides with the character of any of said holograms, then the AND product of an output signal from the shift register already stored with a 1 signal and a signal delivered through the succeeding input terminal $D_i$ presents a 1 signal, causing a 1 signal to be generated on the line $A_i$. The last mentioned 1 signal is conducted to the output terminal 43 through the OR gate $G_4$, AND gate $G_5$ and flip-flop circuit 42, showing that all the characters of the prescribed series are included in the film 25 in a predetermined order. Where, as described above, at least one series of characters establishes coincidence by collation or retrieval throughout the hologram included in one subblock, then the flip-flop circuit 42 is set to detect said coincidence. An output signal from the flip-flop circuit 42 is supplied to a computer through the terminal 43.

Figures 5, 6:
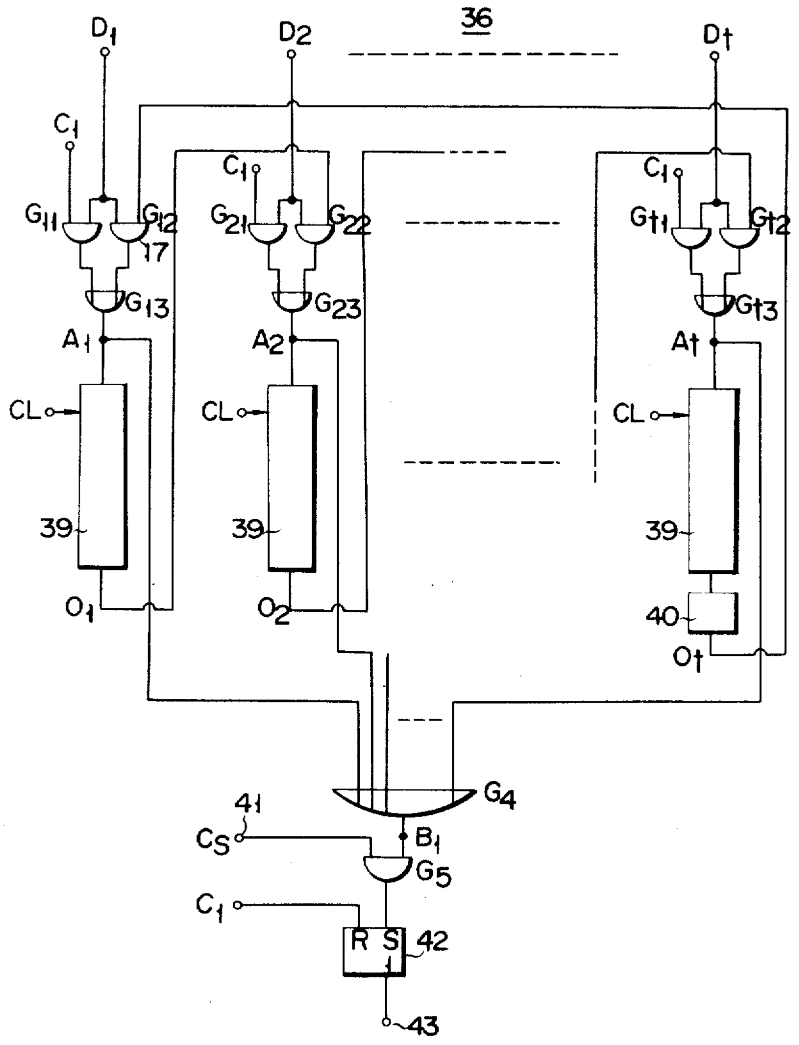
Figure 7:
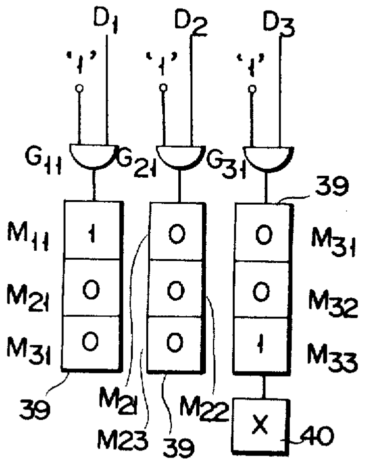

For better understanding of the operation of the aforesaid logic precessing circuit, there will now be described the case where a prescribed series of characters, for example, A, B and C is collated or retrieved through holograms arranged in the 3 × 3 formation as illustrated in FIG. 6. Now let it be assumed that the holograms of FIG. 6 contain various pieces of information denoted by the characters indicated therein. An input signal denoting the character A is supplied to the input terminal 30 of the optical system. A laser beam delivered from the light source 22 is modulated so as to match the character A and projected on the first row of a subblock indicated by *DA. Then, the extreme right character alone corresponds to said modulated input signal. As the result, 0, 0 and 1 signals are supplied to the logic processing circuit. Namely, the two 0 signals are conducted to the input terminals $D_1$ and $D_2$, and the 1 signal to the input terminal $D_3$. These signals are brought to one of the two input terminals of each of the first group AND gates $G_{11}$, $G_{21}$ and $G_{31}$. Since the character A represents the first character of the prescribed series, a signal $C_1$ denoting said first character is supplied to the other input terminal of each of said AND gates $G_{11}$, $G_{21}$ and $G_{31}$, which in turn generate an output signal corresponding to the input signal. These output signals are recorded in the first bit section $M_{11}$, $M_{21}$ and $M_{31}$ of the corresponding 3 bit shift registers 39. When the modulated beam of light scans the second row of the subblock indicated by BCE, then 0, 0 and 0 signals are produced. When the modulated beam of light scans the third row of the subblock indicated by ABF, then 1, 0 and 0 signals are obtained. These output signals are successively recorded in the corresponding shift registers 39 by means of a timing signal. When, therefore, the character A is retrieved throughout all the rows of holograms constituting the subblock, then the shift registers 39 are stored with signals with such a pattern as indicated in FIG. 7. It will be noted that the character X recorded in the 1 bit shift register 40 indicates the data stored in the 3 bit registers 39 prior to the retrieval of the ABC series of characters and is denoted by either 1 or 0 signal. If, in case the character X is indicated by a 1 signal, coincidence should occur by mistake between the second character B of the prescribed series and the first character of the first row or holograms, then a 1 signal will be recorded in the shift register 39 through the AND gate $G_{11}$. Accordingly, there will arise the same result as if the second character B was included in said first row of holograms. To avoid such undesirable event, therefore, the first character section of the first row of holograms is indicated by a special mark, for example * which is not included in the prescribed series of characters.

Figure 8A:
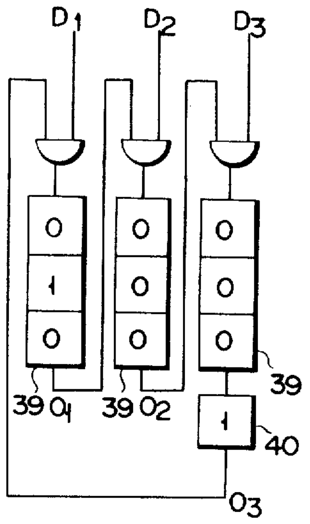
FIG. 8A shows part of the logic circuit where the second character of said series has been scanned through the first row of stored data.
Figure 8B:
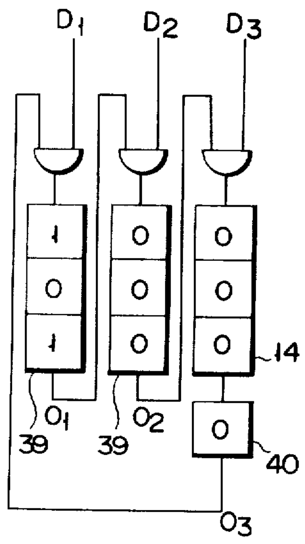
FIG. 8B presents part of the logic circuit where the second character of said series has been scanned through the second row of stored data.
Figure 8C:
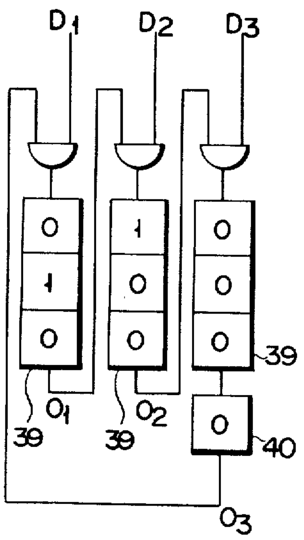
FIG. 8C illustrates part of the logic circuit where said second character has been scanned through the third row of stored data.

Referring to the retrieval of the second character B of the prescribed series, said second character B does not coincide with any of the characters *, D and A constituting the first row of holograms. Accordingly, the signals stored in the first bit sections $M_{11}$, $M_{21}$ and $M_{31}$ of the shift registers 39 are all 0 signals, independently of output signals $O_1$, $O_2$ and $O_3$ from said shift registers (FIG. 8A). When the second character B of the prescribed series is retrieved through the second row of holograms indicated by BCE, then only the first character B of said second row coincides with the second character B of the prescribed series. As the result, the input terminal $D_1$ is supplied with a 1 signal and the other input terminals $D_2$ and $D_3$ with a 0 signal. At this time, the 1 bit shift register 40 is stored with a 1 signal, so that the shift registers 39 are stored, as shown in FIG. 8B, with 1, 0 and 0 signals respectively. When the second character B of the prescribed series is similarly retrieved through the third row of holograms indicated by ABF, then the shift registers 39 present such a pattern as shown in FIG. 8C.

Figure 9:
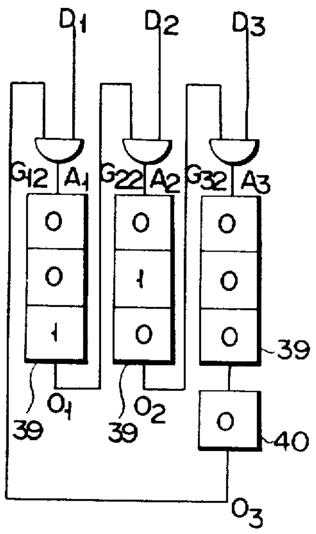

In the case of retrieving the last character C of the prescribed series, 0, 0 and 0 signals are generated with respect to the first row of holograms indicated by *DA, and 0 0, 1 and 0 signals are produced with respect to the second row of holograms indicated by BCE. At the end of the retrieval of the last character C through the first row of holograms, there arises such result that as shown in FIG. 9, the last stage $M_{31}$ of the first stage shift register 39 is already stored with a 1 signal. When the last character C is retrieved through the second row of hologram indicated by BCE, 1 signal resulting from the coincidence between the last character C and the second character C of said second row and a 1 signal supplied to the input terminal $D_2$ due to the coincidence of the second character B of the prescribed series attained by retrieval through the holograms are jointly conducted to the AND gate $G_{22}$, an output signal 1 from which is supplied to the AND gate $G_5$. Since said AND gate $G_5$ is previously opened by a signal $C_s$ denoting the last character C of the prescribed series, the aforesaid 1 signal is transmitted to the output terminal 43 through said AND gate $G_5$ and flip-flop circuit 42, thus showing that the holograms arranged in the 3 × 3 formation contain information corresponding to the respective characters A, B and C of the prescribed series.

The logic processing circuit of the previously described arrangement completely eliminates the necessity of clearing the shift registers prior to the retrieval operation, and permits the continuous detection of coincidence associated with more than two series of characters.

Figure 10:
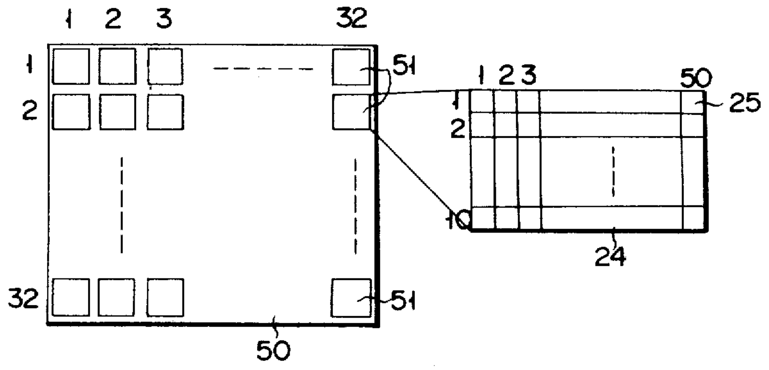
FIGS. 10 and 11 relate to an information retrieval system according to another embodiment of this invention.
Figure 11:
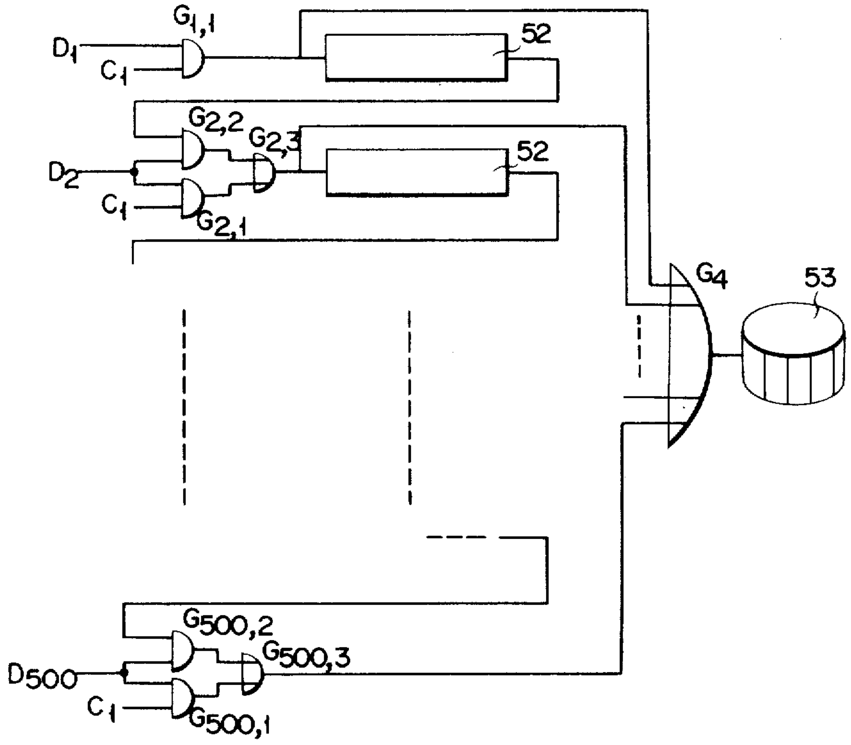

There will now be described by reference to FIGS. 10 and 11 an information retrieval system according to another embodiment of this invention. Referring to FIG. 10, the recording medium consists of a photographic plate 50. Equidistantly arranged on said plate 50 are numerous blocks 51 in a number of 32 × 32. Each block is stored with characters bearing a number of 50 × 10 by means of holography. A laser beam transmitted from the source is focused by an optical system to have an incidence area equal to that occupied by each block 51 before the laser beam is introduced thereinto. Where retrieval is made of a prescribed series of characters bearing a number of K, the laser beam is so deflected as to carry out said retrieval K times through each row of blocks 51. FIG. 11 presents a logic processing circuit used with such type of holograms. Photodetectors and input terminals $D_1$ to $D_{500}$ connected thereto are provided in the same number as the characters included in one block, namely, in a number of 500. The first input terminal $D_1$ supplied with a signal denoting the first character of a prescribed series is connected to one of the two input terminals of an AND gate $G_{1,1}$ so as to cause the corresponding shift register 52 to be supplied with a 1 signal only when coincidence is attained by retrieval through the respective rows of blocks 51 with respect to the first character of the prescribed series. Also in the embodiment of FIGS. 10 and 11, the respective characters of a prescribed series are retrieved in succession through each row of blocks 51. When, therefore, coincidence is attained with respect to the last character thereof as the result of said repeated retrieval, then it is clear that the blocks 51 contain information corresponding to the prescribed series of characters. Accordingly, the 500th input terminal $D_{500}$ supplied with a signal denoting the last character is not connected to any shift register 52. The other input terminals $D_2$ to $D_{499}$ are provided, as in the preceding embodiments, with the AND gates, $G_{2,1}$, $G_{3,1}$ . . . $G_{\ell,1}$ and $G_{2,2}$, $G_{3,2}$ . . . $G_{\ell,2}$ of the first and second groups, OR gates $G_{2,3}$, $G_{3,3}$ . . . $G_{\ell,3}$ supplied with output signals from said AND gates and shift registers 52. Each shift register 52 has the same number of bits (32 in this embodiment) as that of the blocks arranged in the direction in which the photographic plate 50 is scanned by light, namely, in the direction of the row. The output terminals of the OR gates $G_{1,3}$, $G_{2,3}$ . . . $G_{\ell,3}$ are connected to an OR gate $G_4$ through the corresponding conductors $A_1$, $A_2$ . . . $A_l$. These output terminals are connected to a 32 bit shift register 53 which is stored with signals denoting those of the holograms of the respective blocks arranged in each row whose characters indicated coincidence with the prescribed series of characters.

The information retrieval system of FIGS. 10 and 11 arranged as described above is operated, as easily understood, in substantially the same manner as the first embodiment.

With all the embodiments, the result of retrieval is recorded on a computer through the interfaces of the retrieval system. If the characters designating the information contained in some of the blocks have been proved by retrieval to coincide with the prescribed series of characters, then the full text of said information is recorded on the computer by an acousto-optic deflector which is driven when said blocks are brought to a readout window, and finally produced on an input-output typewriter.

As mentioned above, the information retrieval system of this invention can retrieve desired data by searching at once through a large amount of the library information which has been optically stored in a recording medium and is ready to be read out therefrom also optically. Further, the logic processing circuit included in the subject information retrieval system can automatically detect word-with-word coincidence by means of hardware, simplifying processing by the computer and reducing its load.

What we claim is:

1. An information retrieval system which comprises a recording medium for optically storing pieces of information, the pieces of information including a plurality of characters; optical means for scanning the recording medium, which has information stored therein, by a beam of light modulated according to the respective characters of a prescribed series of characters for retrieval and generating signals denoting bright or dark shades of light according to whether or not coincidence is established between the respective characters of said prescribed series and some of the characters designating all the pieces of information stored in the recording medium; photoelectric conversion means having a plurality of members to generate an electric signal denoting coincidence or noncoincidence upon receipt of a signal indicating a bright or dark shade of light; and a logic processing circuit for logically processing a signal delivered from said photoelectric conversion means and generating a retrieval signal showing whether or not the prescribed series of characters for retrieval are included in the characters designating the respective pieces of information stored in the recording medium, the logic processing circuit including AND gates whose first input terminals are successively supplied with output signals from the members of the photoelectric conversion means and shift registers which successively receive and store output signals from the AND gates in a number corresponding to each character of the prescribed series; the output terminals of the shift registers being connected to the second input terminals of the successively following AND gates whereby when the last character of the prescribed series is retrieved, signals resulting from the retrieval of all the characters thereof are generated through the output terminals of the AND gates.

2. An information retrieval system, according to claim 1, wherein the recording medium comprises a film for storing information by means of holography.

3. An information retrieval system according to claim 2, wherein the optical means comprises a source for emitting a laser beam; means for modulating the laser beam according to the respective characters of the prescribed series of characters; and means for deflecting the modulated beam of light to scan the film by said deflector beam.

4. An information retrieval system which comprises a recording medium for optically storing pieces of information, the pieces of information including a plurality of characters; optical means for scanning the recording medium, which has information stored therein, by a beam of light modulated according to the respective characters of a prescribed series of characters for retrieval and generating signals denoting bright or dark shades of light according to whether or not coincidence is established between the respective characters of said prescribed series and some of the characters designating all the pieces of information stored in the recording medium; photoelectric conversion means having a plurality of members to generate an electric signal denoting coincidence or noncoincidence upon receipt of a signal indicating a bright or dark shade of light; and a logic processing circuit for logically processing a signal delivered from said photoelectric conversion means and generating a retrieval signal showing whether or not the prescribed series of characters for retrieval are included in the characters designating the respective pieces of information stored in the recording medium, the logic processing circuit including the first and second AND gates whose first input terminals are connected to the member of the photoelectric conversion means, shift registers of a plurality of bits and having the input terminals connected to the output terminal of the first and second AND gates through a first OR gate and the output terminal connected to the second input terminal of the second AND gate, a 1 bit shift register connected between the output terminal of the last stage shift register and the second input terminal of the second AND gate of the first stage, a third AND gate having one of the input terminals connected to the output terminals of all the second AND gates through a second OR gate, first character signal-supplying means connected to the second input terminal of the first AND gate to open said gate when the first character of the prescribed series is retrieved, and the last character signal-supplying means connected to the other input terminal of the third AND gate to open said third AND gate when the last character of the prescribed series is retrieved, thereby causing an output signal from the second AND gate to be delivered from the third AND gate.

5. An information retrieval system according to claim 4, wherein the logic processing circuit further includes an R.S. flip-flop circuit whose set terminal is connected to the output terminal of the third AND gate, whose reset terminal is connected to the first character signal-supplying means and whose output terminal generates signals showing the results of retrieving all the characters of the prescribed series.

6. An information retrieval system according to claim 4, wherein the recording medium comprises of a strip film for storing information by means of holography, in which a plurality of main blocks are arranged at a prescribed interval along the length of said film and a plurality of subblocks arranged parallel transversely of each of the main blocks and respectively representing a single piece of library information.

7. An information retrieval system according to claim 6, wherein the film has a timing pulse signal-generating hologram provided for each of the blocks to actuate the corresponding shift registers.

8. An information retrieval system which comprises a recording medium for optically storing pieces of information, the pieces of information including a plurality of characters; optical means for scanning the recording medium, which has information stored therein, by a beam of light modulated according to the respective characters of a prescribed series of characters for retrieval and generating signals denoting bright or dark shades of light according to whether or not coincidence is established between the respective characters of said prescribed series and some of the characters designating all the pieces of information stored in the recording medium; photoelectric conversion means having an *m* number of members to generate an electric signal denoting coincidence or noncoincidence upon receipt of a signal indicating a bright or dark shade of light; and a logic processing circuit for logically processing a signal delivered from said photoelectric conversion means and generating a retrieval signal showing whether or not the prescribed series of characters are included in the characters designating the respective pieces of information stored in the recording medium, the logic processing circuit including an *m* number of first AND gates, an $m-1$ number of first shift registers and a single second shift register, the first input terminals of the first AND gates being connected to the corresponding members of the photoelectric conversion means, the first input terminals of the second AND gates being connected to from the second to the *m-th* members of said photoelectric conversion means, the input terminals of the first shift registers being connected to the output terminals of the initial first AND gates and the output terminals of the first AND gates $G_{i,1}$ ($i = 2, 3, \ldots m - 1$) and the output terminals of the second AND gates $G_{i,2}$ ($i = 2, 3, \ldots, n - 1$) through the OR gates $G_{i,3}$ ($i = 2, 3, \ldots m - 1$), and the output terminals of said first shift registers being connected to the second input terminals of the following second AND gates, the output terminals of the first and second AND gates being connected to the input terminal of the single second shift register, and the second input terminals of the first AND gates being provided with means for opening said gates when the first character of the prescribed series is retrieved.

9. An information retrieval system according to claim 8, wherein the recording medium includes a plurality spatially arrranged blocks representing various pieces of library information stored therein by means of holography.

10. An information retrieval system according to claim 8, wherein the number of bits of the respective first shift registers accords with the number of blocks arranged in each row on the photographic plate and the number of bits of the single second shift register accords with the number of blocks arranged in each column on said photographic plate.

* * * * *

UNITED STATES PATENT OFFICE
CERTIFICATE OF CORRECTION

Patent No. 3,872,453 Dated March 18, 1975

Inventor(s) Katsuji TSUKAMOTO, et al

It is certified that error appears in the above-identified patent and that said Letters Patent are hereby corrected as shown below:

Column 10, lines 9-10, change "deflector" to --deflected--;

line 37, change "terminals" to --terminal--;

line 65, delete "of".

Column 12, line 10, change "n-l" to --m-l--.

Signed and sealed this 17th day of June 1975.

(SEAL)
Attest:

RUTH C. MASON
Attesting Officer

C. MARSHALL DANN
Commissioner of Patents
and Trademarks